B. L. BERKEY.
LUBRICATING DEVICE.
APPLICATION FILED JULY 13, 1915.
1,171,693. Patented Feb. 15, 1916.
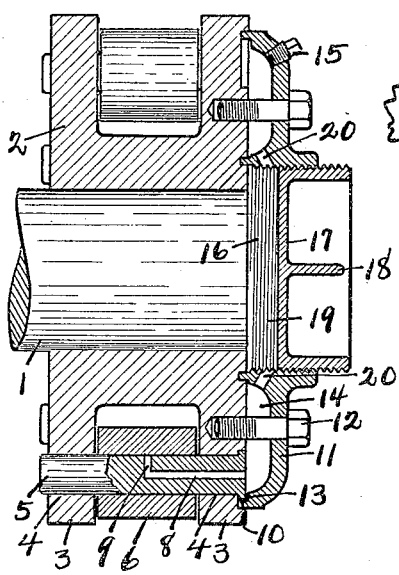
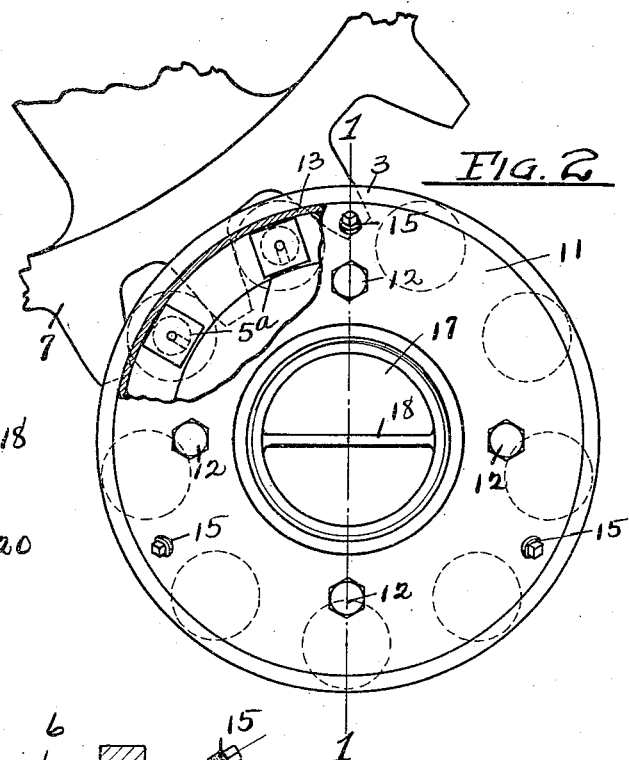
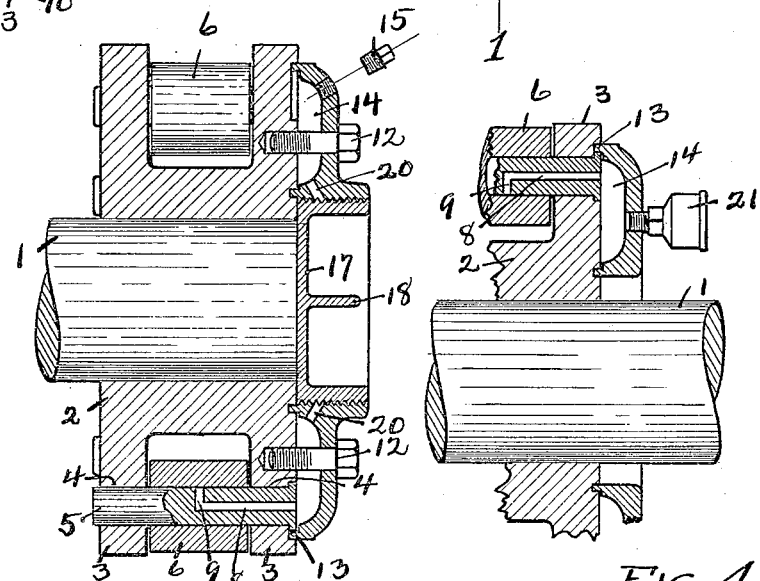
WITNESSES:
B. M. Hartman
W. Horneman
INVENTOR
Benn L. Berkey
BY
H. C. Lund
ATTORNEY

UNITED STATES PATENT OFFICE.

BENN L. BERKEY, OF PORTLAND, OREGON.

LUBRICATING DEVICE.

1,171,693.  Specification of Letters Patent.  Patented Feb. 15, 1916.

Application filed July 13, 1915. Serial No. 39,616.

*To all whom it may concern:*

Be it known that I, BENN L. BERKEY, a citizen of the United States, residing at Portland, in the county of Multnomah and State of Oregon, have invented new and useful Improvements in Lubricating Devices, of which the following is a specification.

This invention relates to lubricating devices for rollers and consists in certain improvements in the construction thereof as will be hereinafter fully described and pointed out in the claims.

The invention is particularly designed for use with rollers annularly mounted in series as in roller gears and in the drawings the invention is exemplified as a roller gear. With such devices difficulty has been experienced in the proper lubrication of the rollers.

The object of the present invention is to simplify the construction and to obviate this difficulty.

The invention is illustrated in the accompanying drawings as follows:—

Figure 1 shows a section on the line 1—1 in Fig. 2. Fig. 2 a side elevation partly in section of a roller gear. Fig. 3 a section on the line 3—3 in Fig. 2 but with the pressure plug in its inner position. Fig. 4 shows an alternative construction which may be used where light oils are used as a lubricant.

1 marks the shaft on which the gear is mounted, and 2 the roller carrier of the gear. The roller carrier has the tool flanges 3—3. These flanges have the perforations 4 in which the pins 5 are arranged. The rollers 6 are journaled on the pins 5. A fragment 7 of a gear meshing the roller gear is shown in Fig. 2. These parts so far as described are of ordinary construction.

Each pin has an axial bore 8 extending inwardly from one of its ends and inwardly by a passage 9 to the bearing surface. One of the flanges 3 has a shoulder 10 arranged on its face in which a cover case 11 fits, screws 12 being provided for clamping the cover plate in place. The cover plate has an annular shoulder 13 which engages the squared heads 5ª of the pins 5 and clamps them in place and locks them against turning so as to retain the passage 9 in a direction toward the center of the gear for a purpose hereinafter specified. The cover plate 11 with the face of the carrier forms an oil chamber 14 which chamber embraces all the openings in the ends of the pins.

Oil may be introduced through an opening closed by a plug 15 but with heavy oils and greases it is desirable to have pressure to force the lubricant to the bearing. In the present construction this is conveniently accomplished by threading a central opening 16 in the cover plate and providing this opening with the screw threaded plug 17. The plug preferably has a lip 18 by means of which it may be turned to exert pressure on the lubricant. A chamber 19 is formed within the opening 16 and between the plug and the end of the shaft. This chamber is connected by passages 20 with the chamber 14. It will be readily seen that if the chamber 19 is filled with grease that it can be forced through the pressure exerted by the plug through the openings 20, chamber 14, openings 8 and passages 9 to the bearing surfaces. It is desirable to have the passages 9 in a direction toward the center of the gear so that when the gear is stationary the weight of the rollers on the upper surfaces of the pins will tend to close the passages 9 on those pins which are toward the bottom of the gear and thus prevent the outflowing of lubricant under these conditions. Where light oil is used the plug 17 may be screwed into its inner position as shown in Fig. 3 and under these conditions the oil is introduced by removing the plug 15 as shown. Under some conditions it may be desirable to supply the chamber 14 with an ordinary oil cup 21 as shown in Fig. 4. Where this is done the plug 15 may be omitted.

What I claim as new is:—

1. In a lubricating device, the combination of an annular roll carrier; pins having bearing surfaces thereon mounted in the carrier and having openings extending inwardly from their ends and radially to the bearing surfaces; rollers on said pins having a journal contact with said bearing surfaces on said pins; and a chamber for lubricant embracing said openings.

2. In a lubricating device, the combination of an annular roll carrier; pins having bearing surfaces thereon mounted in the carrier and having openings extending inwardly from their ends and radially to the bearing surfaces, the radial portions of the openings extending in a direction toward the center of the carrier; rollers on said pins having a journal contact with said bearing surfaces on said pins; and a chamber for lubricant embracing said openings.

3. In a lubricating device, the combination of an annular roll carrier; pins having bearing surfaces thereon mounted in the carrier and having openings extending inwardly from their ends and radially to the bearing surfaces; rollers on said pins having a journal contact with said bearing surfaces on said pins; and a chamber for lubricant embracing said openings comprising a cover plate locking said pins against turning.

4. In a lubricating device, the combination of an annular roll carrier; pins having bearing surfaces thereon mounted in the carrier and having openings extending inwardly from their ends and radially to the bearing surfaces; rollers on said pins having a journal contact with said bearing surfaces on said pins; a chamber for lubricant embracing said openings comprising a cover plate having an annular shoulder on its periphery adapted to engage the ends of the pins to lock the pins in place and against turning.

5. In a lubricating device, the combination of an annular roll carrier; pins having bearing surfaces thereon mounted in the carrier and having openings extending inwardly from their ends and radially to the bearing surfaces; rollers on said pins having a journal contact with said bearing surfaces on said pins; and a chamber for lubricant embracing said openings; and means for exerting pressure on the lubricant in the chamber.

6. In a lubricating device, the combination of an annular roll carrier; pins having bearing surfaces thereon mounted in the carrier and having openings extending inwardly from their ends and radially to the bearing surfaces; rollers on said pins having a journal contact with said bearing surfaces on said pins; a chamber for lubricant embracing said openings comprising a cover plate having a concentric axial opening communicating with said chamber; and a screw plug in said axial opening.

7. In a lubricating device, the combination of a roll carrier having annular flanges with a series of annular perforations therethrough; bearing pins having bearing surfaces thereon in said perforations having openings leading from their ends and radially to the bearing surfaces in a direction toward the center of the carrier; rollers on said pins having a journal contact with said bearing surfaces on said pins; a cover plate on the end of the carrier having shoulders engaging the carrier and forming a chamber for lubricant; a shoulder on said plate engaging said pins to lock them against turning, said plate having a concentric axial opening communicating with said chamber; and a screw plug in said axial opening.

In testimony whereof I have hereunto set my hand in the presence of two subscribing witnesses.

BENN L. BERKEY.

Witnesses:
JAS. P. FARMER,
H. N. NORTON.